(12) United States Patent
Muramoto

(10) Patent No.: US 6,954,286 B1
(45) Date of Patent: Oct. 11, 2005

(54) COLOR CONVERTING APPARATUS

(75) Inventor: Yasuhiko Muramoto, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/372,049

(22) Filed: Aug. 11, 1999

(30) Foreign Application Priority Data

Aug. 19, 1998 (JP) ................................. 10-232903

(51) Int. Cl.[7] ........................................... G06F 15/00
(52) U.S. Cl. ........................ 358/1.9; 358/2.1; 358/518; 358/523
(58) Field of Search ....................... 358/1.9, 2.1, 518, 358/523, 527

(56) References Cited

U.S. PATENT DOCUMENTS

| | | | | |
|---|---|---|---|---|
| 5,467,434 A | * | 11/1995 | Hower et al. ............... | 358/1.15 |
| 5,572,632 A | * | 11/1996 | Laumeyer et al. .......... | 358/1.17 |
| 6,026,216 A | * | 2/2000 | Ohtsuka et al. ............. | 358/1.9 |
| 6,067,406 A | * | 5/2000 | Van Hoof et al. ........... | 358/1.9 |
| 6,104,829 A | * | 8/2000 | Nakajima .................... | 382/167 |
| 6,203,220 B1 | * | 3/2001 | Takenoshita et al. ........ | 400/61 |
| 6,324,975 B1 | * | 12/2001 | Kondo ........................ | 101/171 |
| 6,396,595 B1 | * | 5/2002 | Shimazaki .................. | 358/1.9 |
| 6,693,718 B1 | * | 2/2004 | Takaoka .................... | 358/1.15 |

* cited by examiner

Primary Examiner—Twyler Lamb
(74) Attorney, Agent, or Firm—Sughrue Mion, PLLC

(57) ABSTRACT

A color conversion table as a LUT is generated easily in a simple operation by merging a printing condition profile for color conversion and a printer condition profile. When a file under the title "SLIGHTLY COATED PAPER PRINTING" as a printing condition profile is dragged and dropped (moved) onto a folder "USED FOR OUTPUT" in a file selection image for selecting a not-to-be-merged printing condition profiles, it is automatically merged with the file of a printer condition profile into a new color conversion table relative to "SLIGHTLY COATED PAPER PRINTING". The color conversion table thus generated converts input image data to image data for a proofer such as a printer, and the printer outputs a hard copy based on the converted image data. The user can easily confirm the colors of a finished printed material according to "SLIGHTLY COATED PAPER PRINTING" with the colors of the image on the hard copy. Thus, the hard copy can be used as a color proof.

17 Claims, 9 Drawing Sheets

FIG. 5

| | TITLE | COMMENT | ATTRIBUTE | DATE | VERSION |
|---|---|---|---|---|---|
| | ART PAPER PRINTING | COMPANY F STANDARD PRINTING CONDITION | ORG | ../../.. | 1.00 |
| | COMPATIBLE WITH ART PAPER COMPANY A | ART PAPER PRINTING CONDITION FOR COMPANY A | USR | ../../.. | |
| | COMPATIBLE WITH ART PAPER COMPANY B | ART PAPER PRINTING CONDITION FOR COMPANY B | USR | ../../.. | B-1 |
| | COMPATIBLE WITH MAT PAPER | COMPANY F STANDARD PRINTING CONDITION | ORG | ../../.. | 1.00 |
| | ... | ... | ... | ../../.. | ... |
| | ... | | | | ... |

FOLDER: PRINTING CONDITION⇒USED FOR OUTPUT
COMMENT: ART PAPER CONDITION FOR COMPANY B
VERSION: B-1
TITLE: COMPATIBLE WITH ART PAPER COMPANY B

PRINTING CONDITION
USED FOR OUTPUT
UNUSED
9_10

REGISTER

OK    CANCEL

FIG. 8

REGISTER

FOLDER: PRINTING CONDITION\USED FOR OUTPUT          TITLE: SLIGHTLY COATED PAPER PRINTING

COMMENT: COMPANY F STANDARD PRINTING CONDITION

VERSION: 1.00

- PRINTING CONDITION
  - USED FOR OUTPUT
  - UNUSED
    - 9_10

| TITLE | COMMENT | ATTRIBUTE | DATE | VERSION |
|---|---|---|---|---|
| ART PAPER PRINTING | COMPANY F STANDARD PRINTING CONDITION | ORG | ../../.. | 1.00 |
| COMPATIBLE WITH ART PAPER COMPANY A | ART PAPER PRINTING CONDITION FOR COMPANY A | USR | ../../.. | ... |
| COMPATIBLE WITH ART PAPER COMPANY B | ART PAPER PRINTING CONDITION FOR COMPANY B | USR | ../../.. | B-1 |
| COMPATIBLE WITH MAT PAPER | COMPANY F STANDARD PRINTING CONDITION | ORG | ../../.. | 1.00 |
| SLIGHTLY COATED PAPER PRINTING | COMPANY F STANDARD PRINTING CONDITION | ORG | ../../.. | 1.00 |
| ........ | ........ | ... | ../../.. | ... |

[ OK ]  [ CANCEL ]

200'

COLOR CONVERTING APPARATUS

BACKGROUND OF THE INVENTION

1. Field of the Invention

The present invention relates to a color converting apparatus for use in a proof generating system for generating a color proof carrying a color image on a proof sheet for examining colors and making color corrections, with a proofer which is an image outputting device such as a color printer or the like before a colored printed material with a color image printed on a print sheet is produced by a color printing machine such as a rotary press.

2. Description of the Related Art

It has heretofore been customary in the art of printing and platemaking to generate a color proof carrying a color image on a proof sheet for examining colors and making color corrections, with a proofer such as a color printer or the like before a colored printed material with a color image printed on a print sheet is produced as a final finished product by a color printing machine such as a rotary press.

The proofer is used because it does not require films and printing plates that would be needed by printing machines and can easily generate as many hard copies carrying color images on proof sheets, i.e., color proofs, as required at a low cost within a short period of time.

To form a color image for use as a color proof on a proof sheet, image data dependent on devices such as a printer, a photographic camera, an image sensor, a CRT, an LED, etc., e.g., C (Cyan), M (Magenta), Y (Yellow), B (Black) image data, are converted to calorimetric data that are device-independent image data, i.e., X, Y, Z (stimulus) image data by a standard printing profile such as a four-dimensional lookup table (LUT) or the like that are provided by the manufacturer. Then, a color proof carrying a color image on a proof sheet is produced by a proofer such as a color printer according to a proof profile, e.g., a printer profile (three-dimensional lookup table).

The color proof thus produced by the proofer such as a color printer simulates the colors of a colored printed material to be produced by a color printing machine for confirming the colors prior to an actual printing process carried out by the color printing machine.

In order to generate a color proof with a proofer which is an image outputting device, as described above, it is necessary to convert device-dependent image data to device-independent image data with a printing condition profile as a printing condition color converting means, and then to convert the device-independent image data to device-dependent image data with a printer condition profile as an output condition color converting means and input the device-dependent image data to the image outputting device.

Heretofore, it has been the practice to perform separate computerized processing operations to effect a color conversion process with the printing condition color converting means and a color conversion process with the output condition color converting means. Therefore, these color conversion processes have been time-consuming.

The inventors have decided that the color conversion processes are time-consuming primarily because two processing procedures are required, i.e., input image data are converted to output image data by the printing condition color converting means, and thereafter the output image data are supplied as input image data to the output condition color converting means, which converts the supplied input image data to desired output image data.

Another reason for the time-consuming color conversion processes is that a highly specialized professional skill is needed to perform the computerized processing operations.

SUMMARY OF THE INVENTION

It is therefore an object of the present invention to provide a color converting apparatus which is capable of simply and easily generating a combined color converting means for color conversion.

Another object of the present invention is to provide a color converting apparatus which is capable of generating only a desired merged color converting means.

Still another object of the present invention is to provide a color converting apparatus which is capable of saving a memory storage capacity.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a view showing, by way of example, an image for selecting printing conditions;

FIG. 8 is a view showing, by way of example, an image for selecting printing conditions, which stores a new to-be-merged printing condition profile.

DESCRIPTION OF THE PREFERRED EMBODIMENTS

Figure 1:
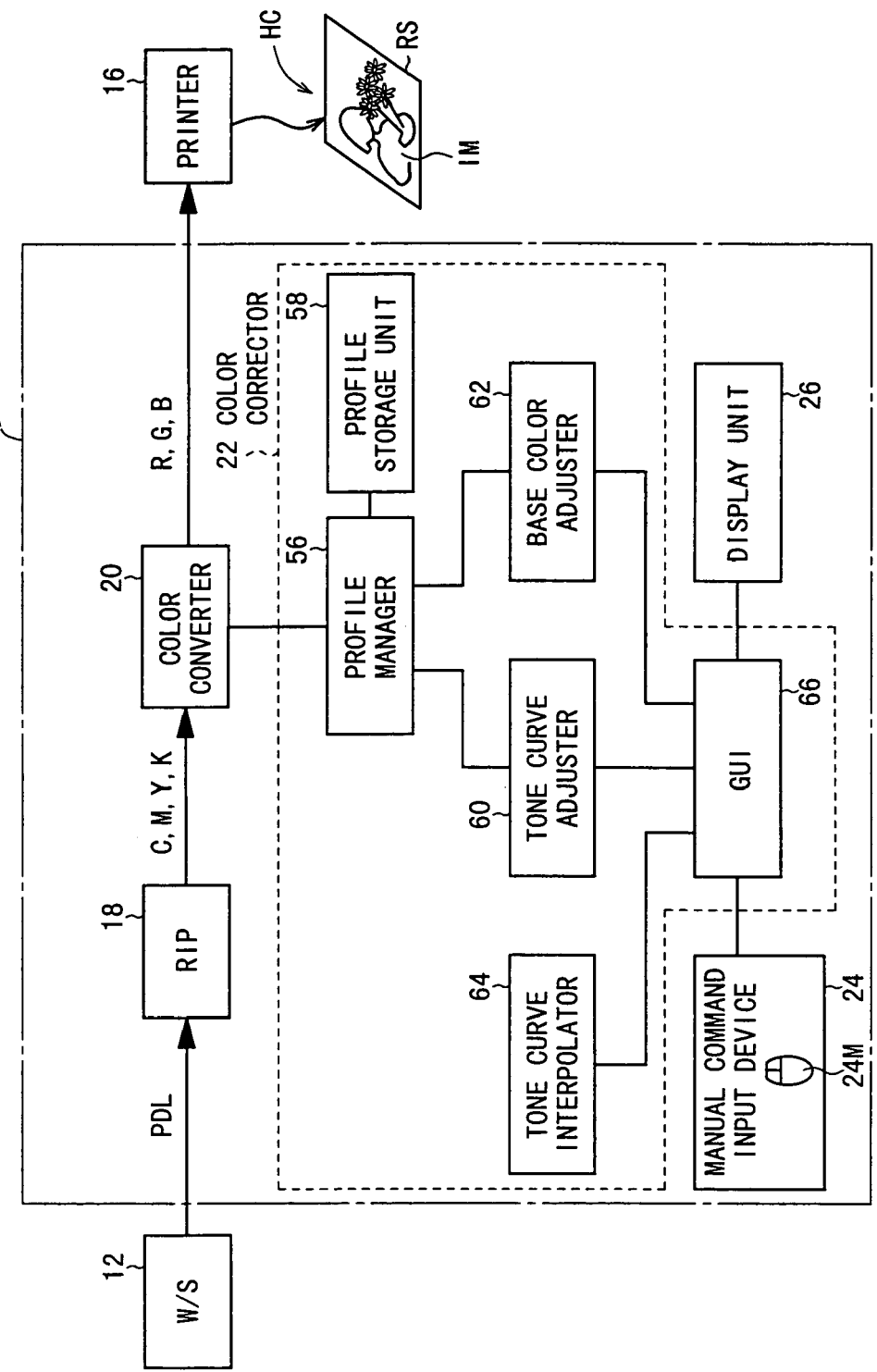
FIG. 1 is a block diagram of a proof system according to an embodiment of the present invention.

FIG. 1 shows in block form a proof system 10 according to an embodiment of the present invention.

As shown in FIG. 1, the proof system 10 basically comprises a workstation 12 functioning as a page make-up apparatus, a host computer 14 functioning as a color converting apparatus, and a printer 16 functioning as a proof image outputting apparatus (proofer).

The workstation 12 edits characters, line drawings, and images captured by a scanner or the like (not shown) on an image displayed on a display unit (not shown), and generates PDL (Page Description Language) data descriptive of one page of image information including positional information, color and density information, etc.

The generated PDL data is supplied to a raster image processor (RIP) 18 of the host computer 14. The raster image processor 18 develops the PDL data into image data in C (cyan), M (magenta), Y (yellow), K (black), i.e., device-dependent input image data, as scanning image data.

The host computer 14 comprises a main section including the raster image processor 18, a color converter (color converting means) 20 having color conversion LUTs (Look Up Tables) as merged color converting means, and a color corrector 22 functioning as a display control means, a manual command input unit 24 including a keyboard, a mouse 24M, etc. and connected to the color corrector 22, and a display unit 26 comprising a color CRT display unit or the like.

Figure 2:
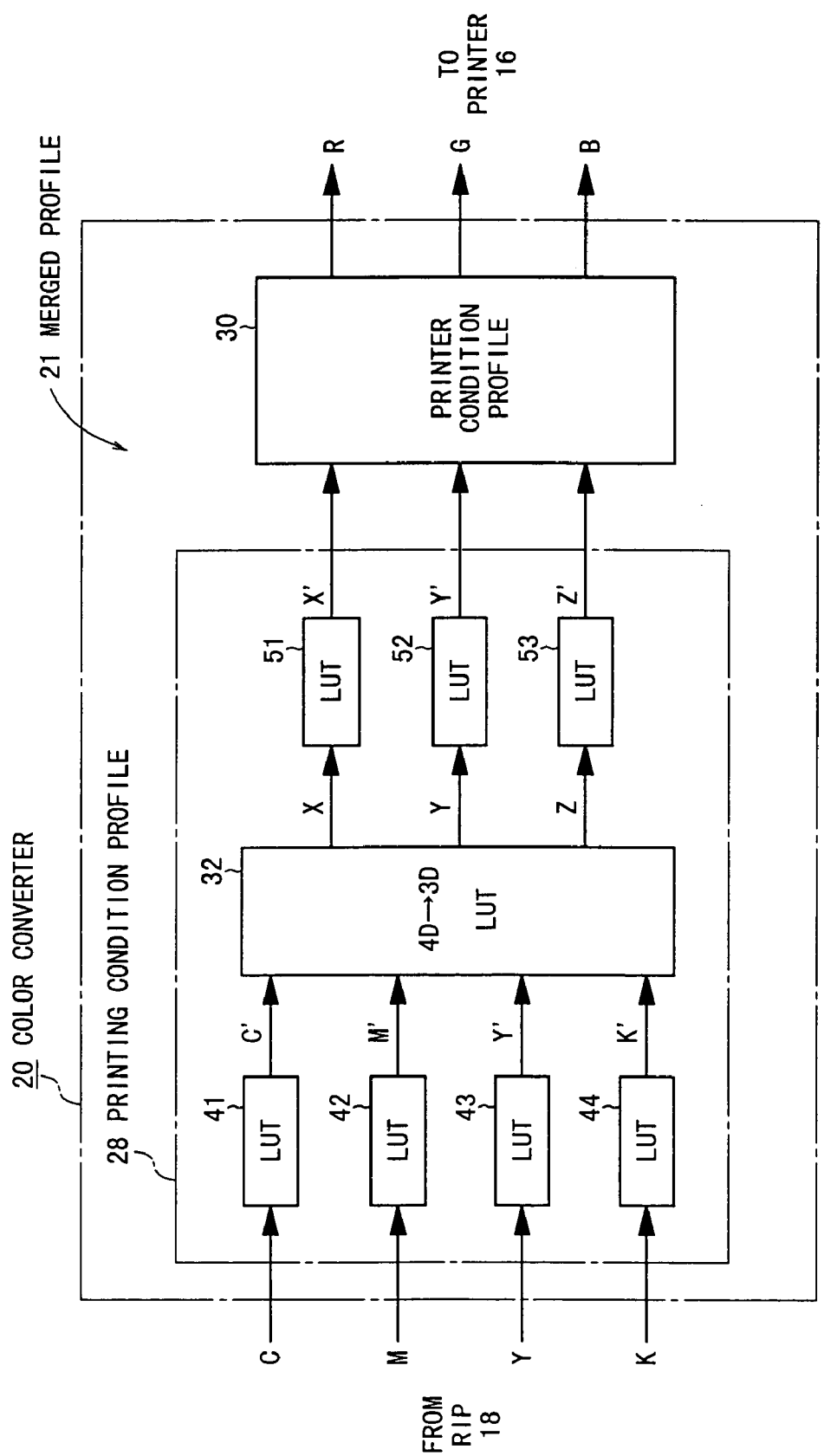
FIG. 2 is a block diagram of a printing condition profile and a printer condition profile which have been merged and established in a color converter in the proof system shown in FIG. 1.

FIG. 2 shows the color converter 20 in detail. The color converter 20 converts C, M, Y, K image data (device-dependent image data) supplied from the raster image processor 18 to R (Red), G (Green), B (Blue) image data (device-dependent image data) for the printer 16 with a printing condition profile (printing condition color converting means) 28 and a printer condition profile (output condition color converting means) 30. Actually, the printing condition profile 28 and the printer condition profile 30 are merged into a merged profile (merged printing condition printer condition profile, merged color converting means, merged profile LUT) 21 as a single lookup table. Therefore, the C, M, Y, K image data supplied to the color converter 20 are converted directly to the R, G, B image data for the printer 16 in one process by the merged profile 21.

If it is assumed that the inputted C, M, Y, K image data are represented by a matrix of four rows and one column and the outputted R, G, B image data are represented by a matrix of three rows and one column, then the merged profile 21 for converting C, M, Y, K image data to R, G, B image data can be considered to be a matrix of three rows and four columns to be multiplied by the matrix of four rows and one column which represents the C, M, Y, K image data. This matrix calculation is an operation to determine a sum of products, and hence can be performed in a short period of time.

When the R, G, B image data are supplied to the printer 16, the printer 16 outputs a hard copy HC (see FIG. 1) as a color proof carrying a color image IM on a color paper CP that serves as a dedicated color proof sheet.

In FIG. 2, the printing condition profile (printing condition color converting means) 28 serves as a color converting means including a color conversion table (four-dimensional-to-three-dimensional conversion lookup table) 32 for effecting conversion between colors depending on a device (a printer, inks, etc.), on a printed material produced by a printing machine (not shown) which is to be simulated by an image IM on a hard copy HC outputted as a proof by the printer 16, and colors not depending on a device, such as calorimetric values or the like.

The color conversion table 32 serves as a printing condition color converting means for converting device-dependent input image data to device-independent input image data in view of printing conditions (inks, print sheets, printing machine types, etc.).

The color conversion table-32 is given in advance by the manufacturer. The color conversion table 32 is a table of colorimetric values against halftone dot % data of C, M, Y, K that are changed at certain intervals. For example, if a table of calorimetric values against halftone dot % data of C, M, Y, K that are changed at intervals of a % is to be produced, then it is necessary to determine colorimetric values of as many colors as the fourth power of β with respect to the four colors of C, M, Y, K when the halftone dot % value is changed from 0 to α to 2α to, . . . , to 100% in β steps. Actually, however, several hundred characteristic colors of those colors are printed as a color chart on a standard print sheet by a standard printing machine, and then colorimetrically measured to generate a colorimetric value table, i.e., a standard color conversion table 32. The color conversion table 32 is also called a printing condition profile core as it is a core of the printing condition profile 28.

The printer condition profile 30 is a color converting means including a color conversion table for effecting color conversion between device-independent colors such as colorimetric values or the like, and device-dependent colors on a hard copy HC outputted from the printer 16. The printer condition profile 30 can be referred to as an output condition color converting means for converting device-independent image data converted by the printing condition profile 28 to device-dependent image data which have taken into account conditions of the printer 16 as a proof image output device.

For generating the printer condition profile 30, the value of each of the R, G, B image data supplied to the printer 16 is changed at given intervals from the 0 level to the maximum level, and color patches produced by combinations of the changed colors of R, G, B are formed on the color paper CP. Then, the color patches on the color paper CP are measured by a calorimeter to determine X, Y, Z colorimetric data, and a conversion table between the inputted R, G, B image data and the outputted X, Y, Z colorimetric data is generated. The generated conversion table is then inversely converted back and interpolated, if necessary, to produce a printer condition profile 30 as an LUT for converting X, Y, Z colorimetric data to R, G, B image data.

The printer condition profile 30 is not limited to a printer condition profile for converting X, Y, Z colorimetric data to R, G, B image data, but may be a printer condition profile for converting X, Y, Z colorimetric data to C, M, Y, K image data. If a printer condition profile for converting X, Y, Z colorimetric data to C, M, Y, K image data is used as the printer condition profile 30, then a printer for outputting a hard copy HC from C, M, Y, K image data is used as the printer 16.

In the printing condition profile 28, C, M, Y, K image data (C, M, Y, K) are converted to gradation-converted C, M, Y, K image data (C', M', Y', K') by one-dimensional LUTs (tone curve adjusting LUTs) 41, 42, 43, 44 each incorporating a tone curve {a curve for converting input gradation values in a range from 0 to 100% to output gradation values (halftone dot %) in a range from 0 to 100%}. The gradation-converted C, M, Y, K image data (C', M', Y', K') are then converted to colorimetric data (X, Y, Z) by the color conversion table 32. The colorimetric data (X, Y, Z) converted to colorimetric data (X', Y', Z') by one-dimensional LUTs 51, 52, 53 for base color correction.

Reasons for the need for the one-dimensional LUTs 41, 42, 43, 44 for tone curve adjustment and the one-dimensional LUTs 51, 52, 53 for base color correction will briefly be described below.

Printing conditions vary depending on many parameters including inks, print sheets, and printing machine types, and, even if these parameters are of the same kind, other parameters including production lots thereof and environmental temperatures at which images are printed. Therefore, the printing conditions of the color conversion table 32 which is a standard printing condition profile core provided by the manufacturer are never in accord with desired printing conditions of a printing machine which the user actually uses. It is thus necessary to adjust the color conversion table 32 according to the actual desired printing conditions, rather than the standard printing condition profile.

Inasmuch as the types of inks and print sheets that are in general use are limited, sheet colors and solid ink colors are relatively stable under different printing conditions. However, intermediate tones may change greatly depending on conditions in which images are printed by the actual printing machine. In order to simply adjust such intermediate tones, the C, M, Y, K one-dimensional LUTs 41, 42, 43, 44 for adjusting the C, M, Y, K tone curves (also referred to as gradation characteristics or dot gains) are inserted in front of the color conversion table (four-dimensional-to-three-dimensional conversion lookup table) 32 for carrying out halftone dot % conversion from C to C', M to M', Y to Y', and K to K' for tone correction.

The LUTs 51, 52, 53 for base color correction are tables for correcting the difference between the base color of a sheet to be used by the printing machine (not shown) and the base color of a sheet used to print color patches thereon which have been used to generate the color conversion table 32. The base color difference represents a colorimetric value difference produced when sheets of art paper from different lots are colorimetrically measured by a colorimeter or the like.

Actually, the printing condition profile 28 and the printer condition profile 30 are merged by a profile manager 56 of the color corrector 22, and established as merged profile 21 which is a single lookup table in the color converter 20.

To the profile manager 56 of the color corrector 22, there are connected a profile storage unit 58 as a mass storage unit for storing the printing condition profile 28 and the printer condition profile 30.

Figure 3:
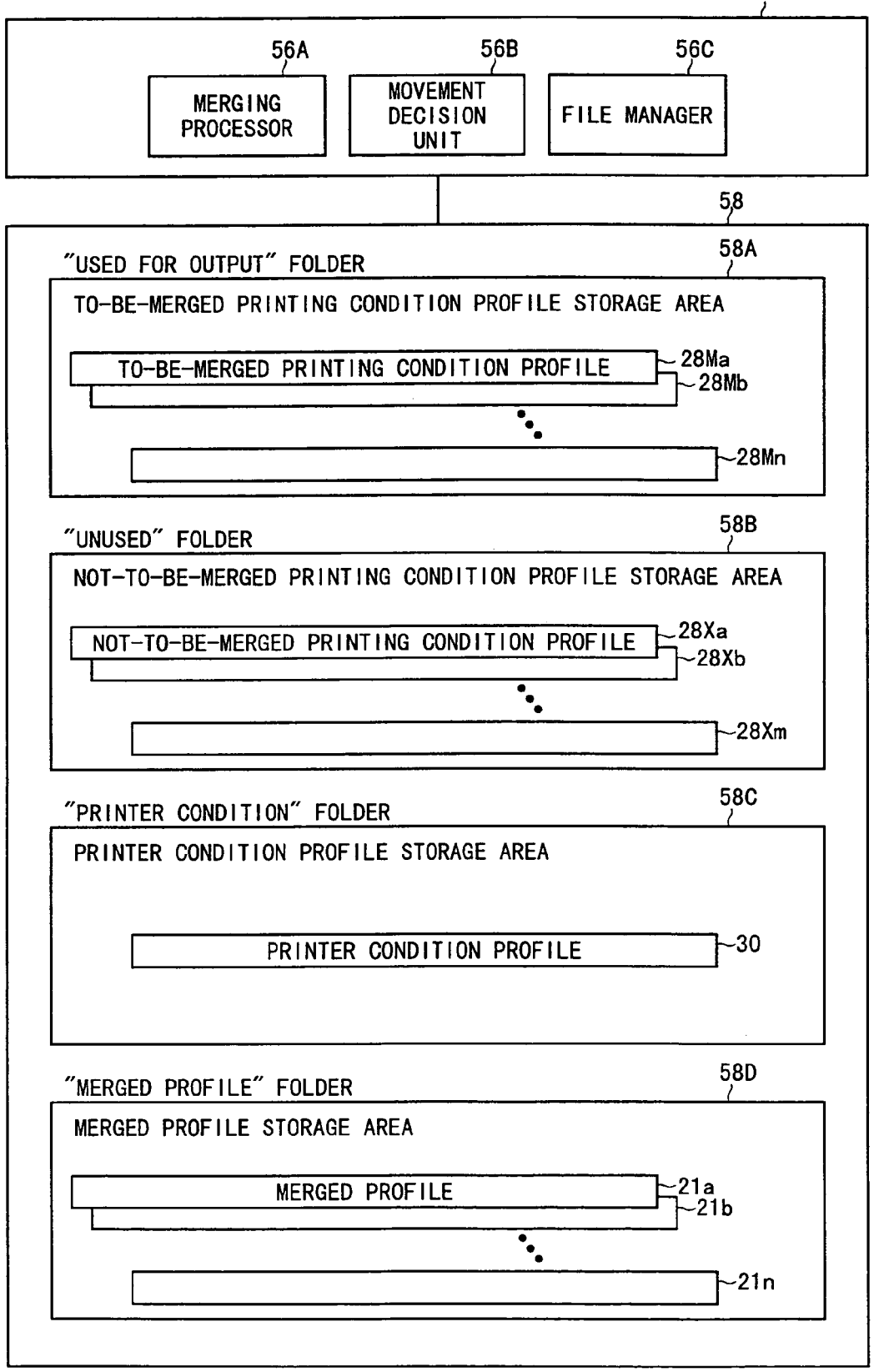
FIG. 3 is a block diagram of an arrangement of a profile manager and a profile storage unit in the proof system shown in FIG. 1.

FIG. 3 shows an arrangement of the profile manager 56 and the profile storage unit 58.

As shown in FIG. 3, the profile storage unit 58 has a to-be-merged printing condition profile storage area (to-be-merged printing color converting means storage area) 58A for storing printing condition profiles (printing color converting means) 28 (28M: 28Ma, 28Mb, . . . , 28Mn) to be merged as files, a not-to-be-merged printing condition profile storage area (not-to-be-merged printing color converting means storage area) 58B for storing printing condition profiles (printing color converting means) 28 (28X: 28Xa, 28Xb, . . . , 28Xn) not to be merged as files, and a printer condition profile storage area (output condition color converting means storage area) 58C for storing the printer condition profile (output condition color converting means) 30, which is a proofer condition profile, as a file.

The profile storage unit 58 also has a merged profile storage area 58D for storing merged profiles (merged color converting means) 21 (21a, 21b, . . . , 21n) which are produced by merging the printing condition profiles 28M and the printer condition profile 30.

Each of the storage areas 58A through 58D functions as a folder capable of storing a plurality of files. In this embodiment, the to-be-merged printing condition profile storage area 58A serves as a "PRINTING CONDITION¥USED FOR OUTPUT" folder, the not-to-be-merged printing condition profile storage area 58B as a "PRINTING CONDITION¥USED" folder, the printer condition profile storage area 58C as a "PRINTING CONDITION" folder, and the merged profile storage area 58D as a "MERGED PROFILE" folder.

Actually, in this embodiment, a memory capacity required to store one of the printing condition profiles 28 is about 20 kB, a memory capacity required to store the printer condition profile 30 is about 4 MB, and a memory capacity required to store one of the merged profiles 21 is about 4 MB. Since each of the merged profiles 21 can be generated in anywhere between ten and twenty seconds, it is not necessary to generate the merged profile storage area 58D as a folder for the purpose of saving the memory capacity.

The profile manager 56 has a file manager 56C for managing files stored in the profile storage unit 58, a movement decision unit 56B for deciding whether the file of a printing condition profile 28X stored in the not-to-be-merged printing condition profile storage area 58B has been moved to the to-be-merged printing condition profile storage area 58A by a file moving means (described later on), and a merging processor 56A as a merging means which, when a not-to-be-merged printing condition profile 28X has been moved from the not-to-be-merged printing condition profile storage area 58B the to-be-merged printing condition profile storage area 58A, regards the moved not-to-be-merged printing condition profile 28X as a to-be-merged printing condition profile 28M, automatically merges the file of the printer condition profile 30 stored in the printer condition profile storage area 58C with the to-be-merged printing condition profile 28M into the file of a new merged profile (merged color converting means) 21, and stores the new merged profile 21 in the merged profile storage area 58D.

The file manager 56C also serves to monitor whether the file contents of the to-be-merged printing condition profiles 28 stored in the to-be-merged printing condition profile storage area 58A and the printer condition profile 30 stored in the printer condition profile storage area 58C are modified (updated) or not, and, if modified, notifies the merging processor 56A of the modification. The merging processor 56A performs a predetermined merging process when notified of the modification.

Specifically, when either one of the to-be-merged printing condition profiles 28Ma through 28Mn is modified, the merging processor 56A merges the modified to-be-merged printing condition profile 28 with the printer condition profile 30 into a merged profile 21, and stores the merged profile 21 in the merged profile storage area 58D. When the printer condition profile 30 is modified, the merging processor 56A merges the modified printer condition profile 30 with each of the to-be-merged printing condition profiles 28Ma through 28Mn stored in the to-be-merged printing condition profile storage area 58A into merged profiles 21a through 21n, and stores the merged profiles 21a through 21n in the merged profile storage area 58D in an overwriting fashion.

As shown in FIG. 1, to the profile manager 56, there are connected a tone curve adjuster 60 for adjusting or correcting the data in the LUTs 41, 42, 43, 44, and a base col- or adjuster 62 for adjusting or correcting the data in the LUTs 51, 52, 53.

The color corrector 22 also has a tone curve interpolator 64 which is used when the data in the LUTs 41, 42, 43, 44 are adjusted or corrected by the tone curve adjuster 60.

The color corrector 22 further includes a graphical user interface (GUI) 66 connected to the base color adjuster 62, tone curve adjuster 60, the tone curve interpolator 64, the display unit 26, and the manual command input unit 24.

The user manipulates an image displayed on the display screen of the display unit 26 with the manual command input unit 24 via GUI 66 for making various adjustments such as tone curve adjustments, base color adjustments, etc. in a user-friendly control environment. In this embodiment, the mouse 24M, the GUI 66, the display unit 26, and the profile manager 56 jointly serve as the file moving means for moving files. Alternatively, only the mouse 24M may be considered as the file moving means.

R, G, B image data converted from C, M, Y, K image data by the color converter 20 are supplied as scanning image data to the printer 16.

The printer 16, which is of the laser exposure, thermal development and transfer type, has three semiconductor lasers which emit respective light beams that have been intensity-modulated by the respective R, G, B image data. The emitted light beams are applied to a donor (not shown) to form a latent image thereon. The donor exposed to the light beams is then wetted with a small amount of water, and an image receiver sheet is applied to the donor and heated to develop the latent image. Dyes produced by the image development are transferred as a visible color image to the image receiver sheet. After the color image has been transferred to the image receiver sheet, the image receiver sheet, which is the color paper CP onto which the image IM has been transferred, is peeled off the used donor, thus providing a hard copy HC as a high-quality color print.

Figure 4:
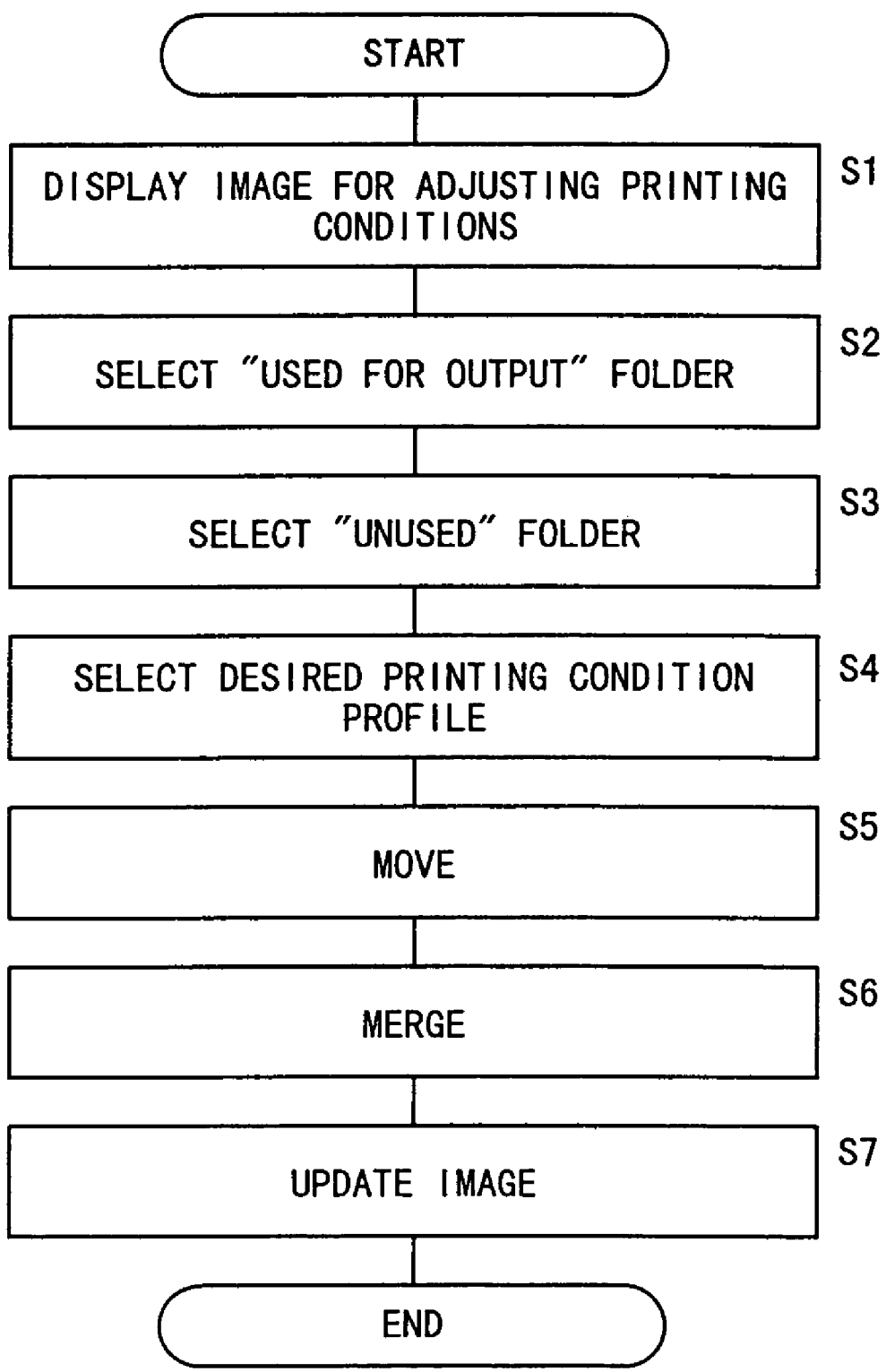
FIG. 4 is a flowchart of a process for generating a new merged profile.

A process of generating a new merged profile 21 will be described below with reference to FIG. 4.

First, the user selects an image for selecting printing conditions via the manual command input unit 24, whereupon an image 200 for selecting printing conditions as shown in FIG. 5 is displayed on the display unit 26 in step S1.

Then, the user selects a folder "USED FOR OUTPUT" from a left column in the image 200 for selecting printing conditions in step S2.

A list of files stored in the folder "USED FOR OUTPUT" is now displayed. Stated otherwise, bibliographical items such as file titles, etc. of the to-be-merged printing condition profiles 28M stored in the to-be-merged printing condition profile storage area 58A (see FIG. 3) are displayed.

In FIG. 5, file titles "ART PAPER PRINTING", "COMPATIBLE WITH ART PAPER COMPANY A", "COMPATIBLE WITH ART PAPER COMPANY B" and "MAT PAPER PRINTINGS" are already set forth in a file title column, and these file titles are accompanied by comments "COMPANY F STANDARD PRINTING CONDITION", "ART PAPER PRINTING CONDITION FOR COMPANY A", "ART PAPER PRINTING CONDITION FOR COMPANY B", and "COMPANY F STANDARD PRINTING CONDITION" set forth in a comment column. Those files which are marked with an attribute "ORG" in an attribute column represent files registered as system files in the host computer 14 from the outset, and those files which are marks with an attribute "USR" represent files generated on the host computer 14 by the user. If the user instructs the host computer 14 to register a file which has been recognized as the attribute "ORG" by the system, then a warning dialog is displayed, indicating to the user that the user cannot modify and register the file under the same title.

In a date column, dates of generation (updating) of files, e.g., "••/••/••"="30/06/98", are displayed. Version numbers (version codes) of files are displayed in a version column.

From the displayed image shown in FIG. 5, the user can recognize the titles, etc. of the to-be-merged printing condition profiles 28M from which merged profiles 21 have already been generated.

In the displayed image shown in FIG. 5, when the user selects, with the mouse 24M, a folder "UNUSED¥9__10¥test-1" as the not-to-be-merged printing condition profile storage area 58B from the left column, a folder "test-1" is opened, and a file selection image 210 (FIG. 6) for selecting not-to-be-merged printing condition profiles 28X is displayed in step S3. Stated otherwise, bibliographical items of the files of the not-to-be-merged printing condition profiles 28X stored in the not-to-be-merged printing condition profile storage area 58B are displayed on the display unit 26.

Figure 6:
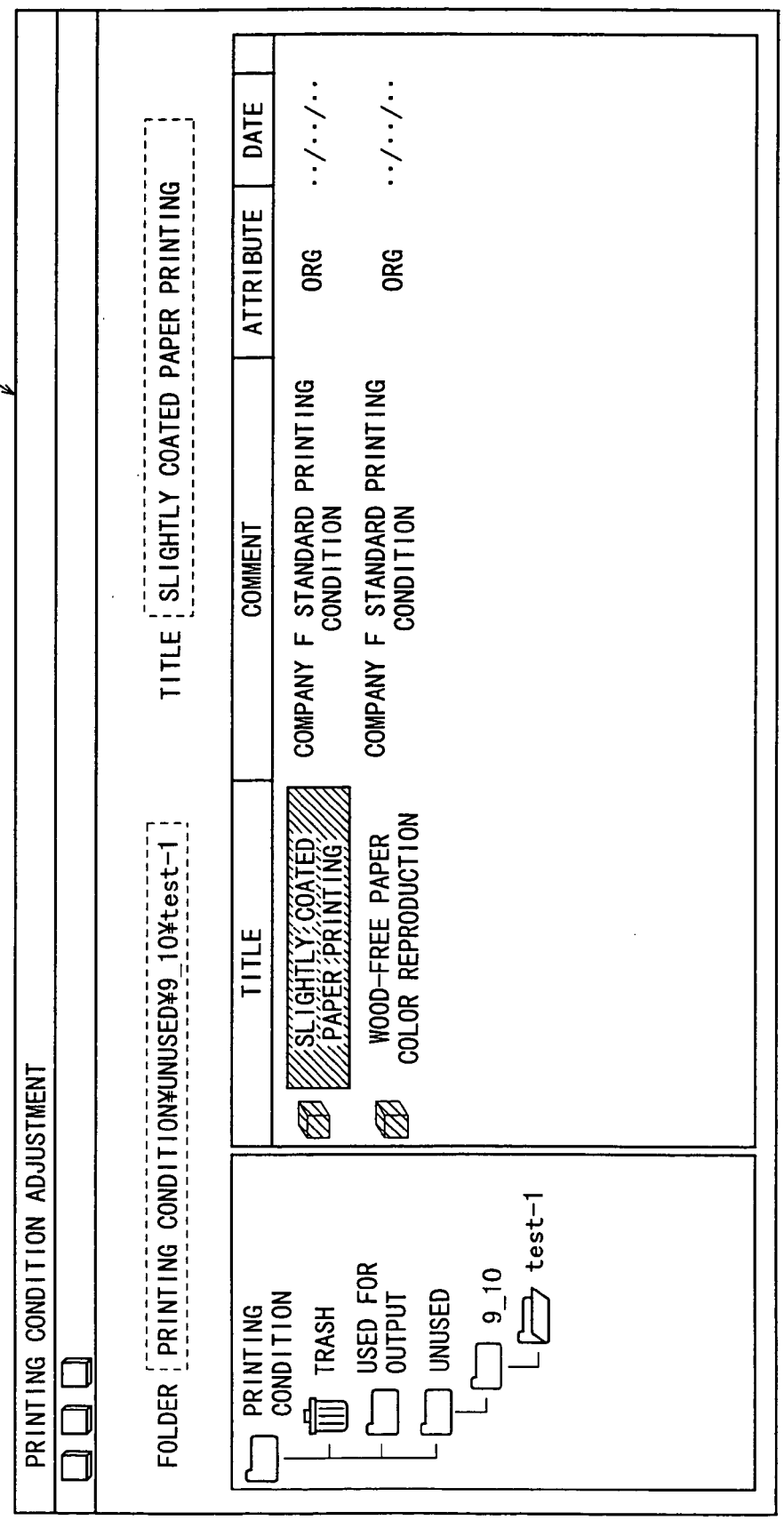
FIG. 6 is a view showing, by way of example, an image of an unused folder.

In the file selection image 210 shown in FIG. 6, a file related to the title "SLIGHTLY COATED PAPER PRINTING" and a file related to the title "WOOD-FREE PAPER COLOR REPRODUCTION" are displayed.

Then, the user selects a desired not-to-be-merged printing condition profile 28X that is presently not to be merged from which a merged profile 21 is to be generated in step S4. It is assumed that the user selects the file of the not-to-be-merged printing condition profile 28X under the title "SLIGHTLY COATED PAPER PRINTING", as highlighted in FIG. 6.

Then, the user moves, with the mouse 24M, the row of the selected title "SLIGHTLY COATED PAPER PRINTING" from the right column to the folder "USED FOR OUTPUT" in the left column in step S5. The movement of the file to the folder "USED FOR OUTPUT" is determined by the movement decision unit 56B.

At this time, a message "IS PRINTING CONDITION PROFILE OF SLIGHTLY COATED PAPER PRINTING TO BE MERGED WITH PRINTER CONDITION PROFILE?" is displayed in the image. When the user clicks on an OK button (not shown), the merging processor 56A starts automatically merging the file with the printer condition profile in step S6.

Figure 7:
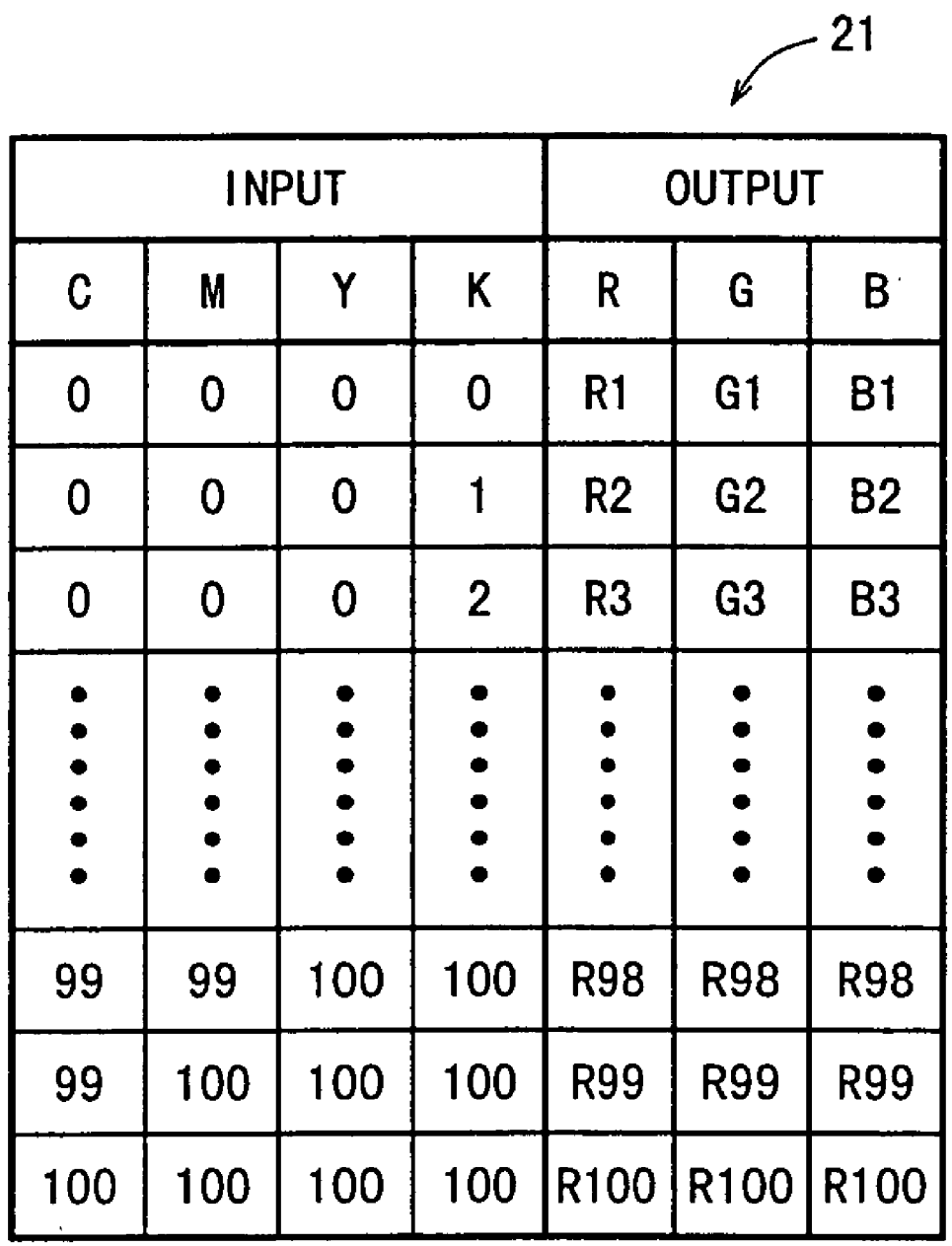
FIG. 7 is a diagram showing a merged profile.

In the automatically merging process, the printing condition profile 28 and the printer condition profile 30 shown in FIG. 2 are merged with each other. Specifically, the contents of the file of the printing condition profile 28 under the title "SLIGHTLY COATED PAPER PRINTING" are read from the not-to-be-merged printing condition profile storage area 58B, and the printer condition profile 30 is read from the printer condition profile storage area 58C. Then, the read printing condition profile 28 and the read printer condition profile 30 are merged into a new merged profile 21 as an LUT as shown in FIG. 7. The new merged profile 0.21 as an LUT serve to determine R, G, B image data outputted from the color converter 20 as (R, G, B)=(R1, G1, B1), (R2, G2, B2), (R3, G3, B3), . . . , (R98, G98, B98), (R99, G99, B99), (R100, G100, B100) with respect to combinations of C, M, Y, K supplied from the raster image processor 18 to the color converter 20, e.g., (C, M, Y, K)=(0, 0, 0, 0), (0, 0, 0, 1), (0, 0, 0, 2), . . . , (99, 99, 100, 100), (99, 100, 100, 100), (100, 100, 100, 100). The generated merged profile 21 is stored in the merged profile storage area 58D.

The image displayed on the display unit 26 is now up-dated into an image 200' for selecting printing conditions in step S7.

In the image 200', the not-to-be-merged printing condition profile 28X under the title "SLIGHTLY COATED PAPER PRINTING" is stored as the file of a new to-be-merged printing condition profile 28M in the to-be-merged printing condition profile storage area 58A corresponding to the "PRINTING CONDITION¥USED FOR OUTPUT" folder, and the title "SLIGHTLY COATED PAPER PRINTING" is displayed in the title column of the image 200'. The user can open a "MERGED PROFILE" folder (not shown) in the merged profile storage area 58D to select a desired merged profile 21 to be established in the color converter 20 from the image of the opened "MERGED PROFILE" folder. At this time, the not-to-be-merged printing condition profile 28X under the title "SLIGHTLY COATED PAPER PRINTING" that has been moved as the to-be-merged printing condition profile 28M to the image 200' for selecting printing conditions shown in FIG. 8 has been deleted from the file selection image 210 shown in FIG. 6.

According to the present embodiment, as described above, for confirming the colors of an image to be printed on a print sheet based on device-dependent input C, M, Y, K image data with the printer 16 before the image is actually printed by the printing machine, when the color converter 20 for converting device-dependent input C, M, Y, K image data to device-dependent R, G, B image data for the printer 16 comprises the merged profile 21 which comprises, as shown in FIG. 2, the printing condition profiles 28 for converting the device-dependent input C, M, Y, K image data to device-dependent image data X, Y, Z in view of printing conditions, and the printer condition profile 30 for converting the device-independent image data X, Y, Z to device-dependent R, G, B image data in view of output conditions of the printer 16, the printing condition profiles 28 are divided into those managed by the to-be-merged printing condition profile storage area 58A which stores them as to-be-merged files and those managed by the not-to-be-merged printing condition profile storage area 58B which stores them as not-to-be-merged files, and the printer condition profile 30 is managed by the printer condition profile storage area 58C which stores it as a file. The file moving means for moving files comprises the mouse 24M, the GUI 66, the display unit 26, and the profile manager 56, and the profile manager 56 has the merging processor 56A. When a not-to-be-merged printing condition profile 28X stored in the not-to-be-merged printing condition profile storage area profile storage area 58A by the file moving means, the merging processor 56A automatically merges the file of the printer condition profile 30 stored in the printer condition profile storage area 58C with the file of the moved printing condition profile 28, i.e., the file with the title "SLIGHTLY COATED PAPER PRINTING" in the illustrated embodiment, into a new merged profile 21, and the new merged profile 21 is stored in the merged profile storage area 58D.

Since the merging process is automatically performed when the file is moved by the file moving means, the new merged profile 21 (see also FIG. 7) for color conversion can simply and easily be generated.

The merged profile 21 is effective to convert device-dependent C, M, Y, K image data to device-dependent R, G, B image data for the printer 16 in one process within a short period of time.

Inasmuch as only a desired printing condition profile (the printing condition profile under the title "SLIGHTLY COATED PAPER PRINTING" in the above embodiment) 28 can be merged, the period of time required for merging the printing condition profile is minimum. Furthermore, because only one new merged profile 21 is generated from the desired printing condition profile, excessive merged profiles 21 are prevented from being generated, and the memory capacity is not used in a wasteful manner. In this embodiment, the process for generating one merged file takes anywhere between ten and twenty seconds, and the memory capacity for storing one merged profile 21 is about 4 MB.

Simply stated, when the file under the title "SLIGHTLY COATED PAPER PRINTING" as a printing condition profile 28 is dragged and dropped (moved) onto the folder "USED FOR OUTPUT", it is automatically merged with the file of the printer condition profile 30 into a new merged profile (color conversion table) 21 relative to "SLIGHTLY COATED PAPER PRINTING". The color conversion table 21 converts input C, M, Y, K image data to R, G, B image data for the color printer 16, and the printer 16 outputs a hard copy HC based on the R, G, B image data. In this manner, the user can easily confirm the colors of a finished printed material according to "SLIGHTLY COATED PAPER PRINTING" with the colors of the image IM on the hard copy HC. Thus, the hard copy CH can be used as a color proof.

Figure 9:
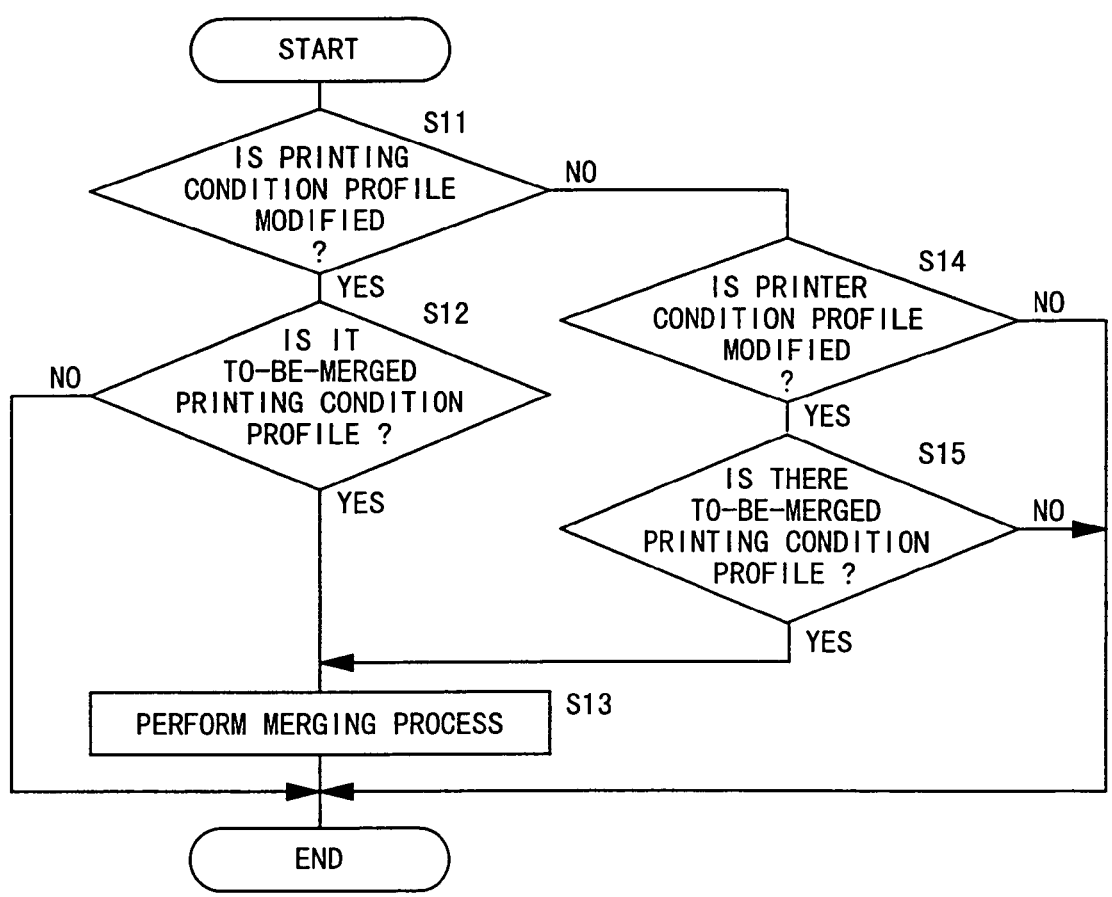
FIG. 9 is a flowchart of a merging process according to another embodiment of the present invention.

FIG. 9 shows a merging process according to another embodiment of the present invention.

In FIG. 9, the file manager 56C monitors whether a printing condition profile 28 is modified or not in step S11. If the printing condition profile 28 is detected as being adjusted using the tone curve adjuster 60 or the base color adjuster 62, then the file manager 56C determines that the printing condition profile 28 is modified.

The file manager 56C then decides whether the modified printing condition profile 28 is a to-be-merged printing condition profile 28M or not in step S12. Specifically, the file manager 56C decides whether the modified printing condition profile 28 is stored in the not-to-be-merged printing condition profile storage area 58B in the profile storage unit 58 or not in order to decide whether the modified printing condition profile 28 is a to-be-merged printing condition profile 28M or not.

If the modified printing condition profile 28 is a to-be-merged printing condition profile 28M stored in the to-be-merged printing condition profile storage area 58A, then the merging processor 56A merges the modified printing condition profile 28 with the printer condition profile 30 into a merged profile 21, and the file manager 56C stores the merged profile 21 in the merged profile storage area 58D in an overwriting fashion, in step S13.

If the modified printing condition profile 28 is not a to-be-merged printing condition profile 28M in step S12, then no profile merging is carried out, and the merging process is ended.

If a printing condition profile 28 is not modified in step S11, then the file manager 56C confirms whether the printer condition profile 30 is modified, e.g., updated, or not in step S14. If the printer condition profile 30 is modified, then the file manager 56C decides whether there is a to-be-merged printing condition profile 28M or not in step S15. If there is a to-be-merged printing condition profile 28M, then the merging processor 56A performs a merging process in step S13.

In the merging process in step S13, the merging processor 56A merges the modified printer condition profile 30 with all the to-be-merged printing condition profile 28Ma through 28Mn stored in the to-be-merged printing condition profile storage area 58A, thus updating all the merged profiles 21a through 21n stored in the merged profile storage area 58D.

If the printer condition profile 30 is not modified in step S14 and if there is no to-be-merged printing condition profile 28M stored in the to-be-merged printing condition profile storage area 58A in step S15, then no profile merging is carried out, and the merging process comes to an end.

According to the present invention, as described above, when a desired printing condition color converting means is moved to a storage area for to-be-merged printing condition color converting means, the printing condition color converting means is automatically merged with an output condition color converting means into a new merged color converting means. Therefore, a merged color converting means for color conversion can easily be generated in a simple operation.

Because the output condition color converting means is automatically merged with only the printing condition color converting means, i.e., only the printing condition color converting means that has been moved to the storage area, into a new merged color converting means, only the desired merged color converting means can be generated.

The printing condition color converting means are divided into those to be merged and those not to be merged. Consequently, the generation of merged color converting means is minimized, stated otherwise, the memory capacity that needs to be used is minimized, and hence can be saved.

When a to-be-merged printing condition color converting means is modified or when the output condition color converting means is modified, a merged color converting means is also generated. Accordingly, a situation where a merged color converting means produced prior to such a modification would be used in error can be avoided.

By using the merged color converting means thus generated, it is possible to convert device-dependent input image data to device-dependent image data for a proof image outputting device in one process. As a result, a color converting process can be performed in a short period of time.

Although certain preferred embodiments of the present invention have been shown and described in detail, it should be understood that various changes and modifications may be made therein without departing from the scope of the appended claims.

What is claimed is:

1. A color converting apparatus comprising:
   merging means for merging printing condition color converting means and output condition color converting means; and
   a storage area for storing to-be-merged printing condition color converting means;
   said merging means comprising means for, when a desired printing condition color converting means is moved into said storage area, merging the moved desired printing condition color converting means with said output condition color converting means into a merged color converting means.

2. A color converting apparatus according to claim 1, further comprising an input unit and a display unit for displaying an image of the storage area for storing to-be-merged printing condition color converting means, said merging means comprising means for, when the desired printing condition color converting means is moved into the displayed image of said storage area, merging the moved desired printing condition color converting means with said output condition color converting means into the merged color converting means.

3. A color converting apparatus according to claim 1, wherein said merging means comprises means for, when a to-be-merged printing color converting means stored in said storage area is modified, merging the modified to-be-merged printing condition color converting means with said output condition color converting means into the merged color converting means.

4. A color converting apparatus according to claim 2, wherein said merging means comprises means for, when a to-be-merged printing condition color converting means stored in said storage area is modified, merging the modified to-be-merged printing condition color converting means with said output condition color converting means into the merged color converting means.

5. A color converting apparatus according to claim 1, wherein said merging means comprises means for, when said output condition color converting means is modified, merging to-be-merged printing condition color converting means stored in said storage area with the modified output condition color converting means.

6. A color converting apparatus according to claim 2, wherein said merging means comprises means for, when said output condition color converting means is modified, merging a to-be-merged printing condition color converting means stored in said storage area with the modified output condition color converting means into the merged color converting means.

7. A color converting apparatus according to claim 1, wherein said printing condition color converting means comprises means for converting device-dependent input image data to device-independent image data in view of printing conditions, said output condition color converting means comprises means for converting said device-independent image data to device-dependent input image data in view of conditions of a proof image outputting apparatus, and said merged color converting means comprises means for converting said device-dependent input image data to device-dependent input image data for said proof image outputting apparatus for confirming the colors of an image to be printed on a print sheet based on said device-dependent input image data with said proof image outputting apparatus before the image is actually printed.

8. A color converting apparatus according to claim 2, wherein said printing condition color converting means comprises means for converting device-dependent input image data to device-independent image data in view of printing conditions, said output condition color converting means comprises means for converting said device-independent image data to device-dependent input image data in view of conditions of a proof image outputting apparatus, and said merged color converting means comprises means for converting said device-dependent input image data to device-dependent input image data for said proof image outputting apparatus for confirming the colors of an image to be printed on a print sheet based on said device-dependent input image said proof image outputting apparatus before the actually printed.

9. A color converting apparatus according to claim 3, wherein said printing condition color converting color converting means comprises mans for converting device-dependent input image data to device-independent image data in vie of printing conditions, said output condition color converting mans comprises means for converting said device-independent image data to device-dependent input image data in view of conditions of a proof image outputting apparatus, and said merged color converting means comprises means for converting said device-independent input image data to device-dependent input image data for said proof image outputting apparatus for confirming the colors of an image to be printed on a print sheet based on said device-dependent input image data with said proof image outputting apparatus before the image is actually printed.

10. A color converting apparatus according to claim 4, wherein said printing condition color converting means comprises means for converting device-dependent input image data to device-independent image data in view of printing conditions, said output condition color converting means comprises means for converting said device-independent image data to device-dependent input image data in view of conditions of a proof image inputting apparatus, and said merged color converting means comprises means for converting said device-dependent input image data to device-dependent input image data for said proof image outputting apparatus for confirming the colors of an image to be printed on a print sheet based on said device-dependent input image data with said proof image outputting apparatus before the image is actually printed.

11. A color converting apparatus according to claim 5, wherein said printing condition color converting means comprises means for converting device-dependent input image data to device-independent image data in view of printing conditions, said output condition color converting means comprises means for converting said device-independent image data to device-dependent input image data in view of conditions of a proof image outputting apparatus, and said merged color converting means comprises means for converting said device-dependent input image data to device-dependent input image data for said proof image outputting apparatus for confirming the colors of an image to be printed sheet based on said device-dependent input image data with said proof image outputting apparatus before the image is actually printed.

12. A color converting apparatus according to claim 6, wherein said printing condition color converting means comprises means for converting device-dependent input image data to device-independent image data in view of printing conditions, said output condition color converting means comprises means for converting said device-independent image data to device-dependent input image data in view of conditions of a proof image outputting apparatus, and said merged color converting means comprises means for converting said device-dependent input image data to device-dependent input image data for said proof image outputting apparatus for confirming the colors of an image to be printed on a print sheet based on said device-dependent input image data said proof image outputting apparatus before the image is actually printed.

13. A color converting apparatus according to claim 1, further comprising a not-to-be-merged printing condition profile storage area for storing printing condition profiles not to be merged as files.

14. A color converting apparatus according to claim 13, wherein a modification to to-be-merged printing conditions stored in said storage area comprises a tone correction, wherein said merging means merges the modified-to-be merged printing conditions with said output condition color converting means.

15. A color converting apparatus according to claim 14, wherein the output condition converting means is subject to modification.

16. A color converting apparatus comprising:
 a merged profile including a printing condition profile and an output condition profile; and
 a storage area for storing a to-be-merged printing condition profile;
 said merged profile, when a desired printing condition profile is moved into the storage area, merging the moved desired printing condition profile with the output condition profile into a merged color converting profile.

17. A color converting apparatus according to claim 16, further comprising an input unit and a display unit for displaying an image of the storage area for storing the to-be-merged printing condition profile, said merged profile comprising a profile which, when the desired printing condition profile is moved into the displayed image of said storage area, merges the moved desired printing condition profile with said output condition profile into the merged color converting profile.

* * * * *